United States Patent [19]

Kim

[11] Patent Number: 5,160,265
[45] Date of Patent: Nov. 3, 1992

[54] BEAUTY KIT FOR AID IN HAIRSTYLE SELECTION

[76] Inventor: Jin S. Kim, 151-70 24th Rd., Whitestone, N.Y. 11357

[21] Appl. No.: 723,406

[22] Filed: Jul. 1, 1991

[51] Int. Cl.$^5$ ............................................. G09B 19/10
[52] U.S. Cl. .................... 434/94; 434/371; 132/212
[58] Field of Search ................. 132/212, 213; 434/94, 434/371

[56] References Cited

U.S. PATENT DOCUMENTS

| | | | |
|---|---|---|---|
| 2,919,502 | 1/1960 | Henry | 434/94 |
| 3,339,453 | 9/1967 | Udich | 434/94 |
| 4,297,724 | 10/1981 | Masuda et al. | 434/94 |
| 4,776,796 | 10/1988 | Nossal | 434/94 |

FOREIGN PATENT DOCUMENTS

| | | | |
|---|---|---|---|
| 291859 | 6/1967 | Australia | 434/94 |
| 3422189 | 12/1985 | Fed. Rep. of Germany | 132/212 |
| 2000021 | 1/1979 | United Kingdom | 132/212 |
| 2221154 | 1/1990 | United Kingdom | 434/371 |

*Primary Examiner*—John G. Weiss
*Assistant Examiner*—Michael Lynch

[57] ABSTRACT

A hair piece selection kit for aiding a person in the selection of a desired hairstyle is disclosed having a plurality of generally square-shaped flat members. A facial hole is cut generally centrally in the flat members, each of the flat members having a different hairstyle printed thereon about the facial hole to depict a hairstyle, and a reflective surface for viewing each hairstyle when said person inserts the face into the facial hole to view the hairstyle.

2 Claims, 1 Drawing Sheet

BEAUTY KIT FOR AID IN HAIRSTYLE SELECTION

FIELD OF THE INVENTION

This invention relates to a hair piece selection kit and is particularly related to a kit designed to aid in the selection of hair pieces in order to determine the desired hairstyle for an individual.

BACKGROUND OF THE INVENTION

Customarily, hair pieces, popularly called "wigs" or "toupees", are often used by men and women alike either because of baldness, usually in case of men, or for aesthetic and beauty reasons, generally by women. Ordinarily, in selecting a hair piece, the individual is given a variety of them to try, either in a hair salon or a boutique. The different hair pieces are placed one at a time, upon the head while facing a mirror, until eventually the individual selects a hair piece having the style and/or color which is most suitable or compatible with his or her face and complexion.

Also, many women seek a hairstyle which is similar to their favorite model or actress based on her photograph in a magazine or a poster, and hence they look for a similar hairstyle. However, they can only confirm once whether or not the model's hairstyle is actually suitable for them before they change to another hairstyle. Therefore, they take great pains in selecting the desired hairstyle. In the event, however, that they are not satisfied with their selection and wanted to change to another hairstyle, this is somewhat difficult to do immediately because of frequent treatment of the hair pieces with dyes and chemicals.

Accordingly, it is an object of this invention to provide a hairstyle kit which would permit women (and men) to select the hair piece which is most suitable for their faces and complexions.

It is a further object of this invention to provide such hairstyle beauty kit containing a variety of hairstyles which can be tried frequently and quickly in order to select the desired hair piece.

The foregoing and other objects and features of this invention will be more clearly appreciated from the following detailed description and the ensuing drawings.

SUMMARY OF THE INVENTION

In accordance with this invention, a hair piece selection kit is employed for aiding a women in the selection of a hair piece having the desired hairstyle. The kit comprises a plurality of generally square-shaped flat members such as a cardboard or a plastic, each having a hole cut out therein to insert the face. Each of said cardboards has printed thereon, defined about said hole, a hairstyle which differs from the hairstyle printed on any other cardboard. The person using the kit selects a given cardboard, inserts his or her face in the hole and views herself in a reflective surface such as a mirror provided with the kit. As many hairstyles are thus tried until the person finds the hairstyle which best fits his or her face and complexion.

BRIEF DESCRIPTION OF THE DRAWINGS

In the drawings, wherein like reference numerals are employed to designate like parts.

In the drawings, wherein like reference numerals are employed to designate like parts.

DETAILED DESCRIPTION OF THE INVENTION

Figure 1:
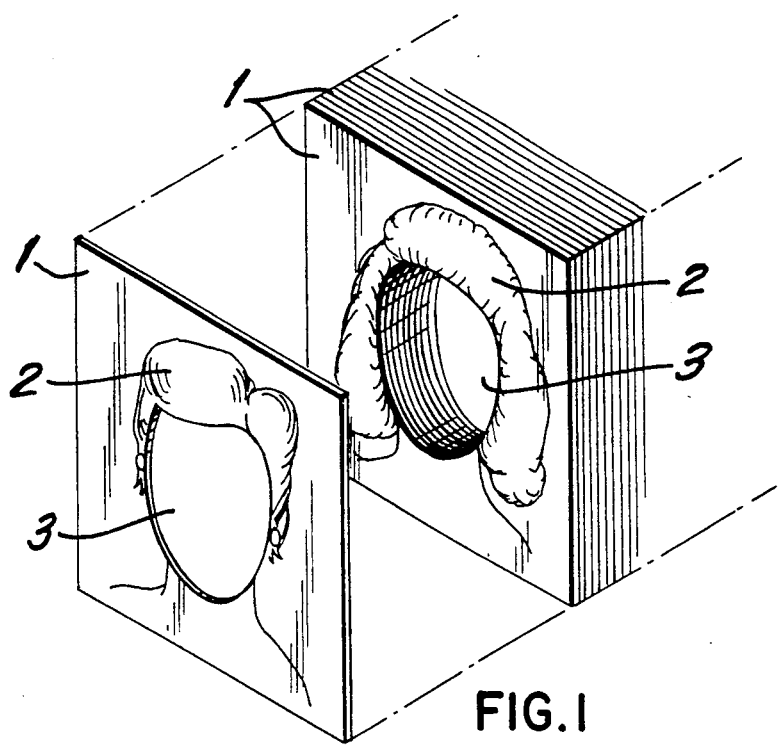
FIG. 1 is a perspective view of the hairstyle kit of the present invention.

Referring first to FIG. 1, there is a shown a plurality of generally square frames 1 made of a suitable cardboard or a plastic material. Each frame 1 has a facial hole 3 which is cut out of the cardboard or the plastic and is generally sized to accommodate the face of an adult individual. Each facial hole 3 has print mounted thereon a hair piece 3 and since the kit contains a plurality of frames 1, a corresponding plurality of hair pieces 3, each having a different hairstyle than the other can be used. Obviously, the number of the frames 1, and hence the variety of hair pieces 3 can vary as desired to cover a range of hairstyles.

Figure 2:
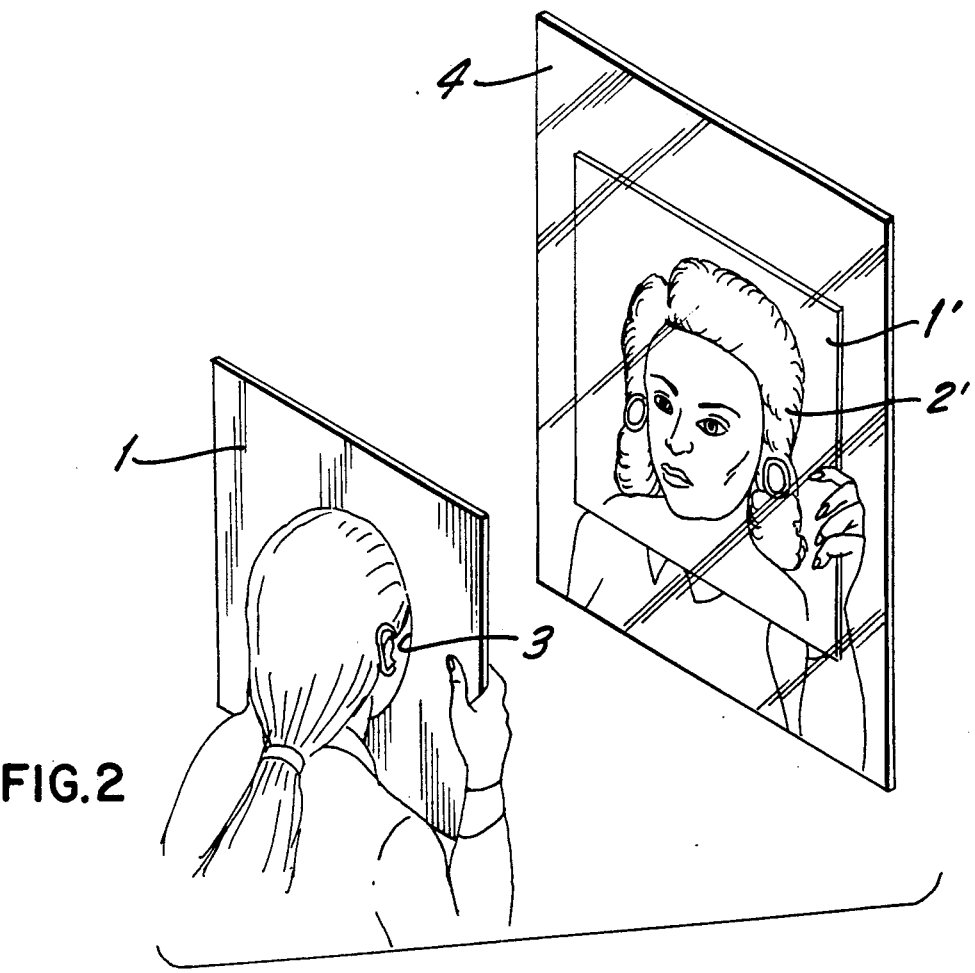
FIG. 2 is a view illustrating the manner in which the hairstyle kit of the present invention is used.

In use, and with reference to FIG. 2, the individual selects a frame having the particular hair piece style 3 and inserts her face in the facial hole 2 and looks at the mirror 4 wherein the frame 1 is reflected as 1' and the hair piece 2 is reflected as 2'. If she is dissatisfied with the selected hairstyle, she will place that frame back and select another frame with a different hairdo and will repeat this procedure until she finds the hairstyle most fitting and pleasing to her taste.

Thus, the present invention permits the use of different hairstyles based on the different hairpieces 2 which are pre-printed on the cardboard, about the facial hole 2. Once the woman has selected the hairstyle of her choice she can select a hair piece which matches the selected hairstyle.

The cardboards 1 may be stacked within a suitable box or container which can also serve to hold the minor. However, the cardboards may be simply stacked adjacent to one another and a separate mirror used when selecting different hairstyles.

What is claimed is:

1. A hair piece selection kit for aiding a person in the selection of a desired hairstyle comprising a plurality of generally square-shaped flat members, a facial hole cut generally centrally in said flat members, each of said flat members having a different hairstyle printed thereon about said facial hole to depict a hairstyle, a reflective surface for viewing each hairstyle when said person inserts the face into said facial hole to view said hairstyle.

2. A hair piece selection kit as in claim 1 wherein each of said flat members is formed of cardboard or plastic material.

* * * * *